United States Patent
Kupcho

(10) Patent No.: US 9,865,890 B2
(45) Date of Patent: Jan. 9, 2018

(54) SEALING APPARATUS FOR A FUEL CELL STACK

(71) Applicant: INTELLIGENT ENERGY LIMITED, Loughborough (GB)

(72) Inventor: Kevin Kupcho, Loughborough (GB)

(73) Assignee: INTELLIGENT ENERGY LIMITED, Loughborough (GB)

( * ) Notice: Subject to any disclaimer, the term of this patent is extended or adjusted under 35 U.S.C. 154(b) by 91 days.

(21) Appl. No.: 14/766,659

(22) PCT Filed: Feb. 10, 2014

(86) PCT No.: PCT/GB2014/050380
§ 371 (c)(1),
(2) Date: Aug. 7, 2015

(87) PCT Pub. No.: WO2014/122482
PCT Pub. Date: Aug. 14, 2014

(65) Prior Publication Data
US 2015/0372327 A1   Dec. 24, 2015

(30) Foreign Application Priority Data

Feb. 11, 2013   (GB) .................................. 1302349.4

(51) Int. Cl.
*H01M 8/04* (2016.01)
*H01M 8/10* (2016.01)
(Continued)

(52) U.S. Cl.
CPC ... *H01M 8/04223* (2013.01); *H01M 8/04014* (2013.01); *H01M 8/04089* (2013.01);
(Continued)

(58) Field of Classification Search
CPC .............. H01M 8/04; H01M 8/04223; H01M 8/04014; H01M 8/04087; H01M 8/10;
(Continued)

(56) References Cited

U.S. PATENT DOCUMENTS

2009/0317685 A1   12/2009   Yajima et al.

FOREIGN PATENT DOCUMENTS

| CN | 101313433 A | 11/2008 |
| EP | 2581973 A1 | 4/2013 |

(Continued)

OTHER PUBLICATIONS

Great Britain Patent Application No. 1302349.4; Search Report; dated Jul. 5, 2013; 3 pages.
(Continued)

*Primary Examiner* — Karie O'Neill Apicella
(74) *Attorney, Agent, or Firm* — Baker & Hostetler LLP

(57) ABSTRACT

A fuel cell stack assembly comprises a stack of fuel cells, each fuel cell having an air flow conduit with an input/output ventilation aperture disposed on a ventilation face of the stack, the ventilation apertures forming an array over said ventilation face of the stack. A membrane is moveable between a first configuration in which the ventilation face is occluded and a second configuration in which the ventilation face is not occluded. The membrane is rollable between the first configuration and the second configuration. Ventilation of the fuel cell stack is thereby controlled by the position of the membrane, e.g. during fuel cell start up and/or shut down procedures or for hydration control of the fuel cells.

13 Claims, 6 Drawing Sheets

(51) Int. Cl.

| | | |
|---|---|---|
| *H01M 8/24* | (2016.01) | |
| *H01M 8/04223* | (2016.01) | |
| *H01M 8/2465* | (2016.01) | |
| *H01M 8/04089* | (2016.01) | |
| *H01M 8/04746* | (2016.01) | |
| *H01M 8/04014* | (2016.01) | |
| *H01M 8/1004* | (2016.01) | |
| *H01M 8/04828* | (2016.01) | |
| *H01M 8/04291* | (2016.01) | |
| *H01M 8/1018* | (2016.01) | |
| *H01M 8/241* | (2016.01) | |

(52) U.S. Cl.
CPC ... *H01M 8/04753* (2013.01); *H01M 8/04761* (2013.01); *H01M 8/1004* (2013.01); *H01M 8/1018* (2013.01); *H01M 8/24* (2013.01); *H01M 8/2465* (2013.01); *H01M 8/0485* (2013.01); *H01M 8/04291* (2013.01); *H01M 8/241* (2013.01); *H01M 2008/1095* (2013.01); *H01M 2300/0082* (2013.01)

(58) Field of Classification Search
CPC .... H01M 8/1004; H01M 8/1018; H01M 8/24; H01M 8/241
See application file for complete search history.

(56) References Cited

FOREIGN PATENT DOCUMENTS

| | | |
|---|---|---|
| FR | 2899019 | 9/2007 |
| JP | H01221863 | 9/1989 |
| WO | 0239527 | 5/2002 |

OTHER PUBLICATIONS

International Search Report and Written Opinion dated Jul. 28, 2014 in International Application No. PCT/GB2014/050380.

SEALING APPARATUS FOR A FUEL CELL STACK

CROSS-REFERENCE TO RELATED APPLICATIONS

This application is a National Stage of International Patent Application No. PCT/GB2014/050380, filed Feb. 10, 2014 and claims priority to foreign application GB 1302349.4, filed Feb. 11, 2013, the contents of which are incorporated herein by reference in their entirety.

The present invention relates to electrochemical fuel cells disposed in a stack formation, and in particular to air flow systems for ventilating such fuel cell stacks.

Conventional electrochemical fuel cells convert fuel and oxidant, generally both in the form of gaseous streams, into electrical energy and a reaction product. A common type of electrochemical fuel cell for reacting hydrogen and oxygen comprises a polymeric ion transfer membrane, also known as a proton exchange membrane (PEM), within a membrane-electrode assembly (MEA), with fuel and air being passed over respective sides of the membrane. Protons (i.e. hydrogen ions) are conducted through the membrane, balanced by electrons conducted through a circuit connecting the anode and cathode of the fuel cell. To increase the available voltage, a stack is formed comprising a number of series-connected MEAs arranged with separate anode and cathode fluid flow paths. Such a stack is typically in the form of a block comprising numerous individual fuel cell plates held together by end plates at either end of the stack.

Because the reaction of fuel and oxidant generates heat as well as electrical power, a fuel cell stack requires cooling once an operating temperature has been reached, to avoid damage to the fuel cells. Cooling may be achieved by forcing air through the fuel cell stack. In an open cathode stack, the oxidant flow path and the coolant flow path are the same, i.e. forcing air through the cathode fluid flow paths both supplies oxidant to the cathodes and cools the stack. In lower power applications, or in periods of low demand, cooling and oxidant supply may alternatively be provided by diffusion of air into the oxidant/coolant flow paths, i.e. without forced ventilation. In other fuel cell stacks, the oxidant air may be provided separate from a cooling mechanism which could be provided by, for example, a cooling water circuit.

The present invention is applicable to all of these fuel cell stack types.

During start up or shut down of a fuel cell stack, or during periods of very cold ambient conditions, it can be useful to prevent or restrict the flow of air through the cathode fluid flow paths. Various methods have been proposed in the prior art for controlling air flow through the cathode fluid flow paths using valves or shutters. It is an object of the invention to provide an alternative approach which is compact and efficient.

The membranes, catalyst materials and diffuser media found in fuel cells can also be susceptible to contamination from external sources which can degrade the performance of a fuel cell stack over time. It is desirable to limit the exposure of the sensitive parts of the fuel cells from particulates and other airborne contaminants, or from gases which can poison the catalysts. Particularly during periods of non-use such as when shipping the fuel cell stack and when the fuel cell stack environment is not controlled (e.g. when there is a risk of contamination from transient or temporary airborne pollution), it is desirable to close air flow paths into the cathode fluid flow paths. It is an object of the invention to provide a compact and efficient way of limiting exposure of the sensitive parts of the fuel cell stack to contamination.

According to one aspect the present invention provides a fuel cell stack assembly comprising:
  a stack of fuel cells, each fuel cell having an air flow conduit with an input/output ventilation aperture disposed on a ventilation face of the stack, the ventilation apertures forming an array over said ventilation face of the stack;
  a membrane moveable between a first configuration in which the ventilation face is occluded and a second configuration in which the ventilation face is not occluded.

The membrane may be rollable between the first configuration and the second configuration. The membrane may comprise a first portion providing at least one aperture configured to expose the ventilation face when disposed thereover and a second portion configured to occlude the ventilation face when disposed thereover. The fuel cell stack assembly may further include a first receptacle for receiving a first portion of the membrane in a rolled condition when the membrane is in the first configuration. The fuel cell stack assembly may further include a second receptacle for receiving a second portion of the membrane in a rolled condition when the membrane is in the second configuration. The first receptacle may be disposed at a peripheral edge of the ventilation face. The first and second receptacles may be disposed on opposing peripheral edges of the ventilation face. The fuel cell stack assembly may further include a motor configured to drive the membrane between the first configuration and the second configuration. The fuel cell stack assembly may further include a peripheral seal disposed around the perimeter of the ventilation face, the membrane being positioned for engagement with the peripheral seal at least in the first configuration. The membrane may be positioned for sliding engagement with at least parts of the peripheral seal during movement to the first configuration. A controller may be configured to operate the membrane between the first and second configurations as part of a fuel cell start up and/or shut down procedure. The membrane may be moveable to an intermediate configuration in which some air flow conduits in each cell of the fuel cell stack are occluded and in which other air flow conduits in each cell of the fuel cell stack are not occluded. The membrane may be moveable to a configuration in which air flow conduits of first selected cells within the fuel cell stack are occluded and in which air flow conduits of second selected cells within the fuel cell stack are not occluded. A controller may be configured to operate the membrane between membrane configurations according to a hydration level of the fuel cells.

According to another aspect, the present invention provides a method of operating a fuel cell stack assembly comprising the steps of:
  mounting a moveable membrane onto a stack of fuel cells, each fuel cell having an air flow conduit with an input/output ventilation aperture disposed on a ventilation face of the stack, the ventilation apertures forming an array over said ventilation face of the stack;
  driving the membrane between a first configuration in which the ventilation face is occluded and a second configuration in which the ventilation face is not occluded.

Embodiments of the present invention will now be described by way of example and with reference to the accompanying drawings in which.

Figure 1:
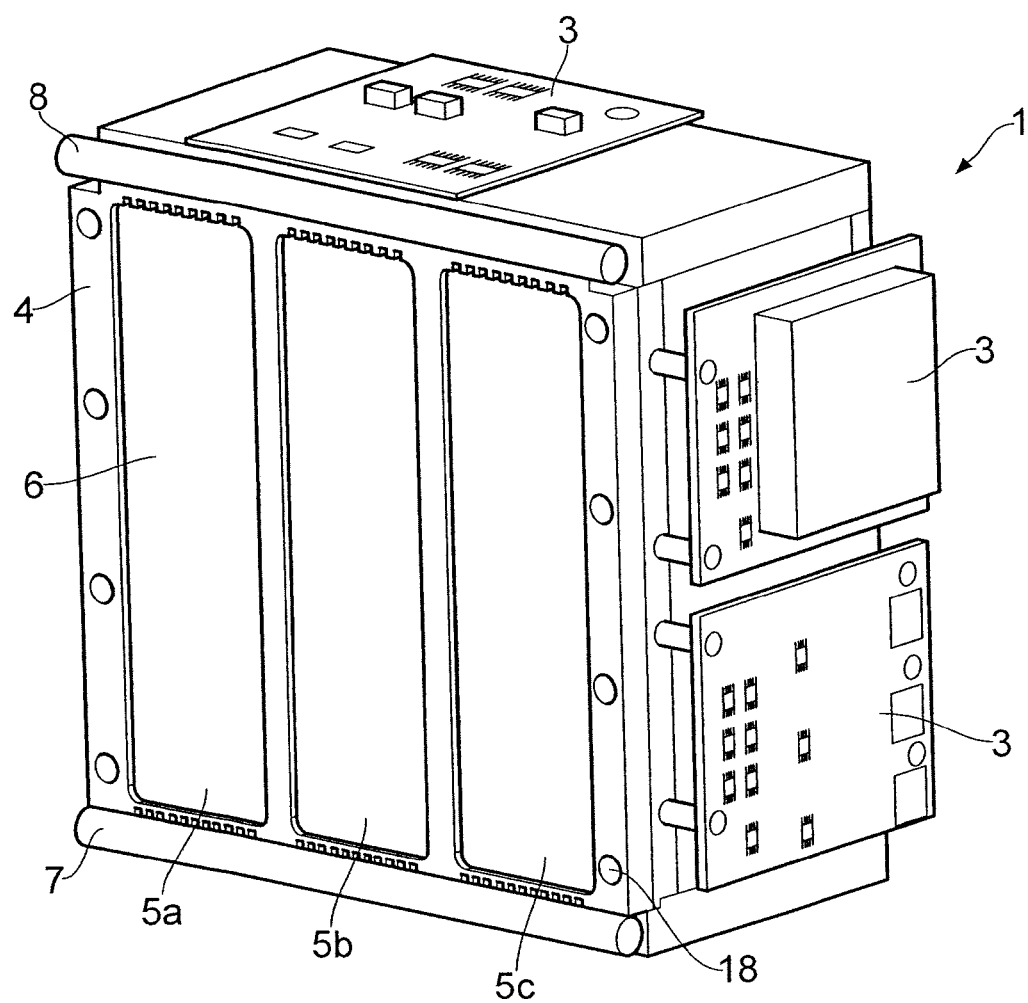
FIG. 1 shows a perspective view of a fuel cell stack with a ventilation face occluded by a membrane.
Figure 2:
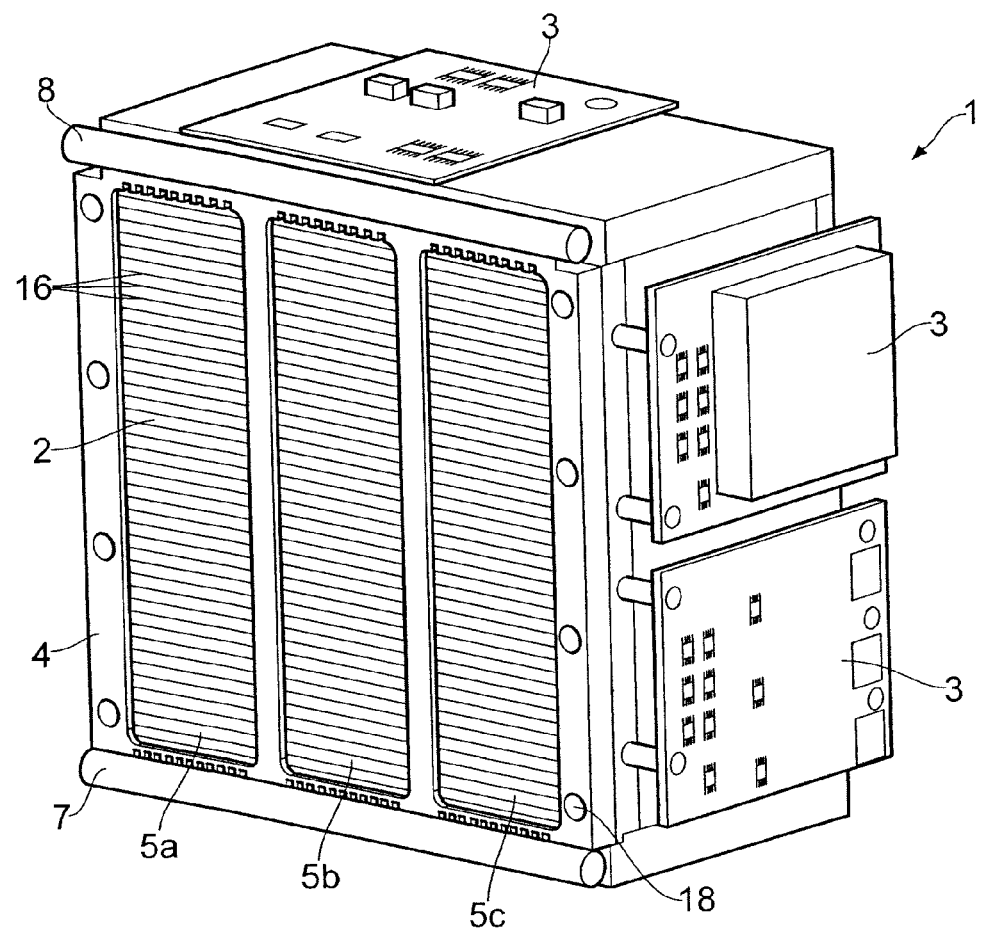
FIG. 2 shows a perspective view of the fuel cell stack of FIG. 1 with the ventilation face not occluded by the membrane.

Throughout the present specification, the descriptors relating to relative orientation and position, such as "top", "bottom", "horizontal", "vertical", "left", "right", "up", "down", "front", "back", as well as any adjective and adverb derivatives thereof, are used in the sense of the orientation of the fuel cell stack as presented in FIGS. 1 and 2. However, such descriptors are not intended to be in any way limiting to an intended use or orientation of the described or claimed invention.

FIGS. 1 and 2 show a fuel cell stack 1 comprising a stack of individual fuel cells 16 which collectively present a ventilation face 2 visible in FIG. 2 at the front of the stack. A corresponding ventilation face may exist on the reverse face of the stack, for example if the stack is of a design requiring forced ventilation through the stack. The ventilation face 2 generally comprises an array of ventilation apertures of a plurality of fuel cells 16 that enable oxidant air to be input to and/or output from cathode fluid flow paths in each cell 16. This enables oxidant to reach the membrane electrode assembly of each cell 16 and/or humidified air to be expelled from the MEA. As shown in FIG. 2, the individual cells 16 each occupy a horizontal plane and the ventilation face 2 corresponds to an edge of every cell 16. However, in an alternative arrangement, the individual cells 16 could each occupy a vertical plane.

Various fuel cell support systems 3 may be disposed on and around the faces of the fuel cell stack.

Positioned on the ventilation face 2 is a frame 4 having one or more openings 5a, 5b, 5c therein, allowing passage of air to the ventilation face 2. The frame 4 serves as a housing and a guide to a flexible membrane 6 (visible in FIG. 1) which is moveable between a first configuration in which the ventilation face 2 is occluded (FIG. 1) and a second configuration in which the ventilation face 2 is not occluded (FIG. 2).

Each one of a pair of receptacles 7, 8 provides a chamber 13 (visible in FIG. 6) for receiving at least a part of the flexible membrane 6. The chamber 13 of the first receptacle 7 can, for example, be configured to receive an occluding portion of the membrane 6 when the stack ventilation face 2 is not occluded and the chamber 13 of the second receptacle 8 can, for example, be configured to receive a non-occluding portion of the membrane 6 when the stack ventilation face 2 is occluded. In a preferred embodiment as shown, the receptacles 7, 8 are configured as cylindrical housings although other shapes are also possible.

Figure 3:
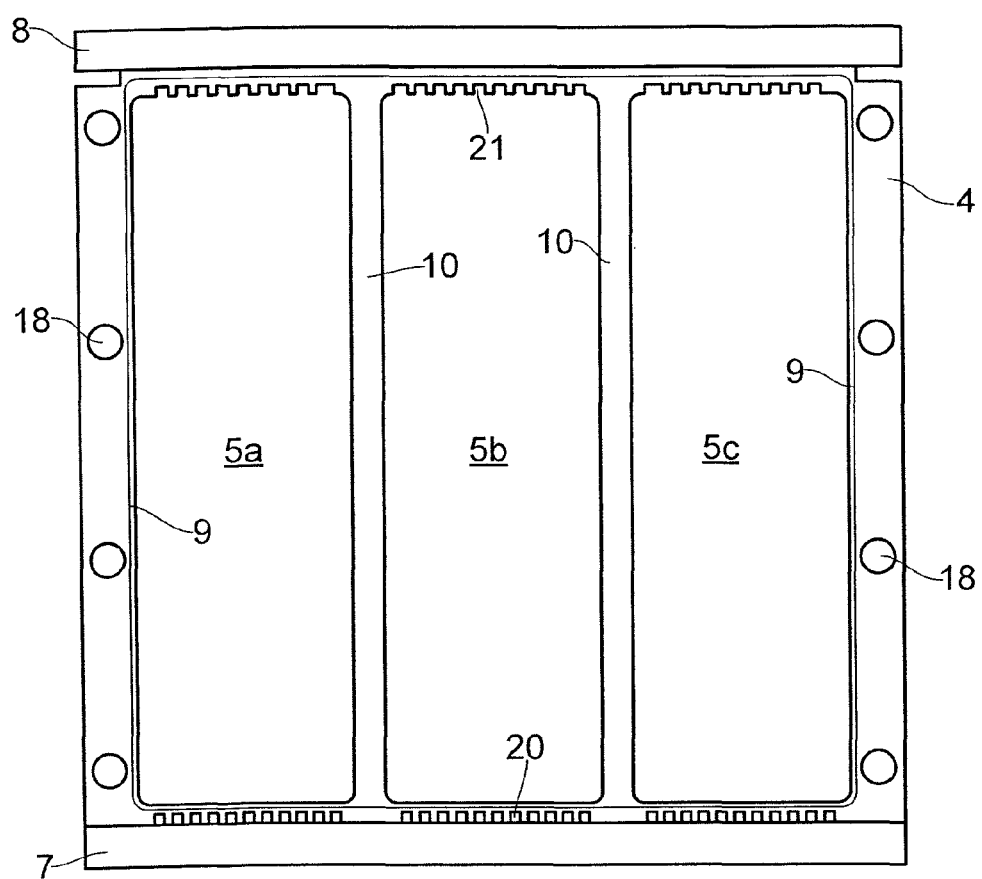
FIG. 3 shows a front view of ventilation face frame with elastomeric peripheral seal.

FIG. 3 shows a front view of the frame 4, including the first and second receptacles 7, 8, the apertures 5a, 5b, 5c and fixing points 18 for bolts or other mechanisms to secure the frame to the front face of the fuel cell stack 1. The frame 4 also includes a peripheral seal 9 which extends around a perimeter of the frame for providing a fluid seal against the membrane 6. Additional seals (not shown) may be provided in pillars 10 that divide the apertures 5a, 5b, 5c. One example of the peripheral seal is an o-ring type seal partially recessed into a retaining channel in a surface of the frame 4, with part of the o-ring standing proud of the surface of the frame. The frame 4 may also include a number of apertures 20 or cut-away slots 21 which allow air flow to current collector plates typically found at the top and bottom on the fuel cell stack.

Figure 4:
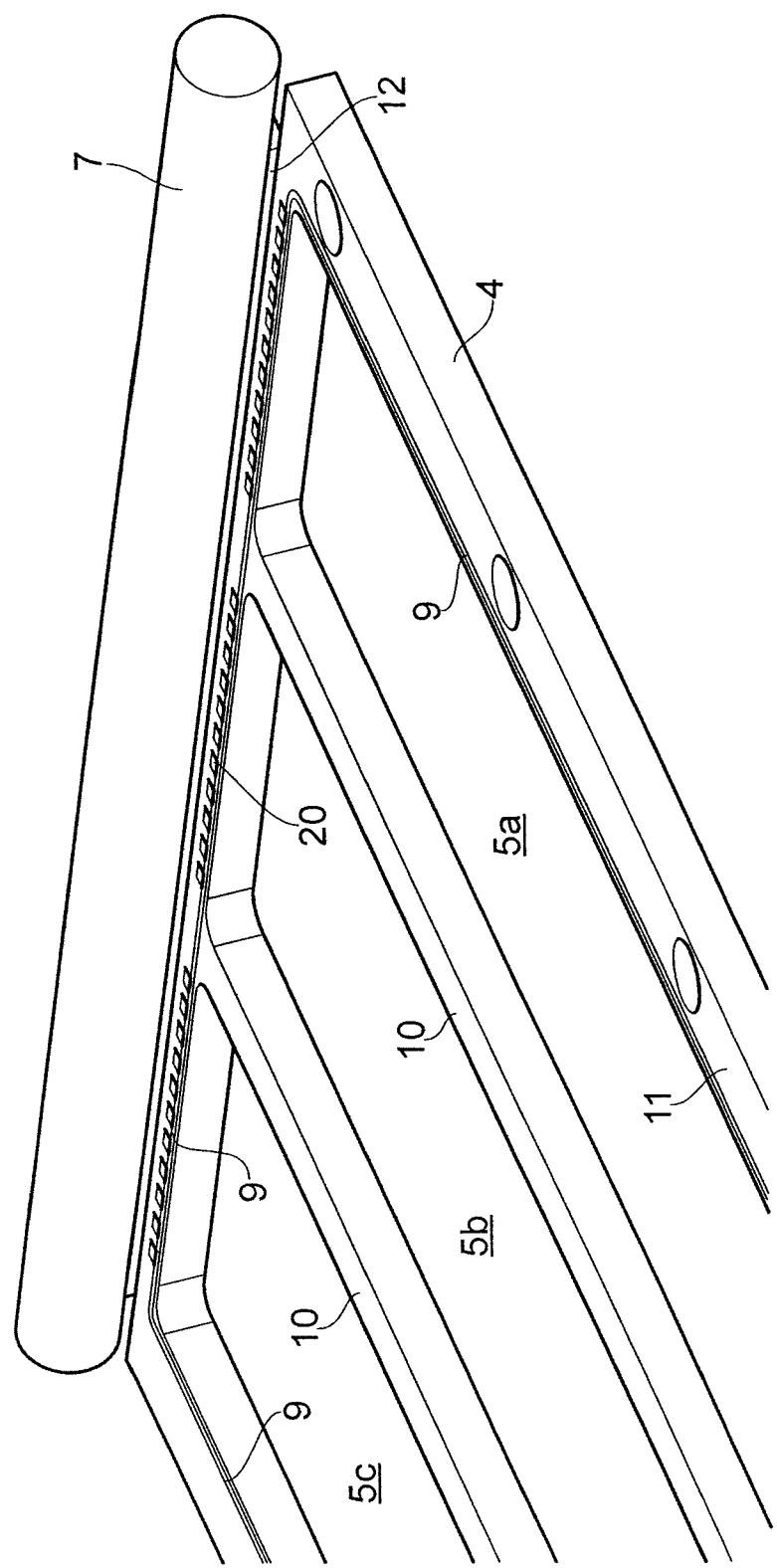
FIG. 4 shows a perspective view of a portion of the ventilation face frame of FIG. 3 with a membrane receptacle disposed on one edge.

FIG. 4 shows a perspective view of a part of the frame 4, the first receptacle 7, the apertures 5a, 5b, 5c and the peripheral seal 9 protruding slightly from a front face 11 of the frame 4. Also visible is a slot 12 extending over a width of the frame 4 corresponding approximately with the width of the apertures 5a, 5b, 5c, and the margin beyond the apertures to at least the peripheral seal 9. The slot 12 enables the membrane 6 to pass into and out of the receptacle 7 and holds the membrane flat against the peripheral seal 9. A corresponding slot is also found at the top edge of the frame 4, enabling the membrane 6 to pass into and out of the other receptacle 8, in similar fashion.

Figure 5:
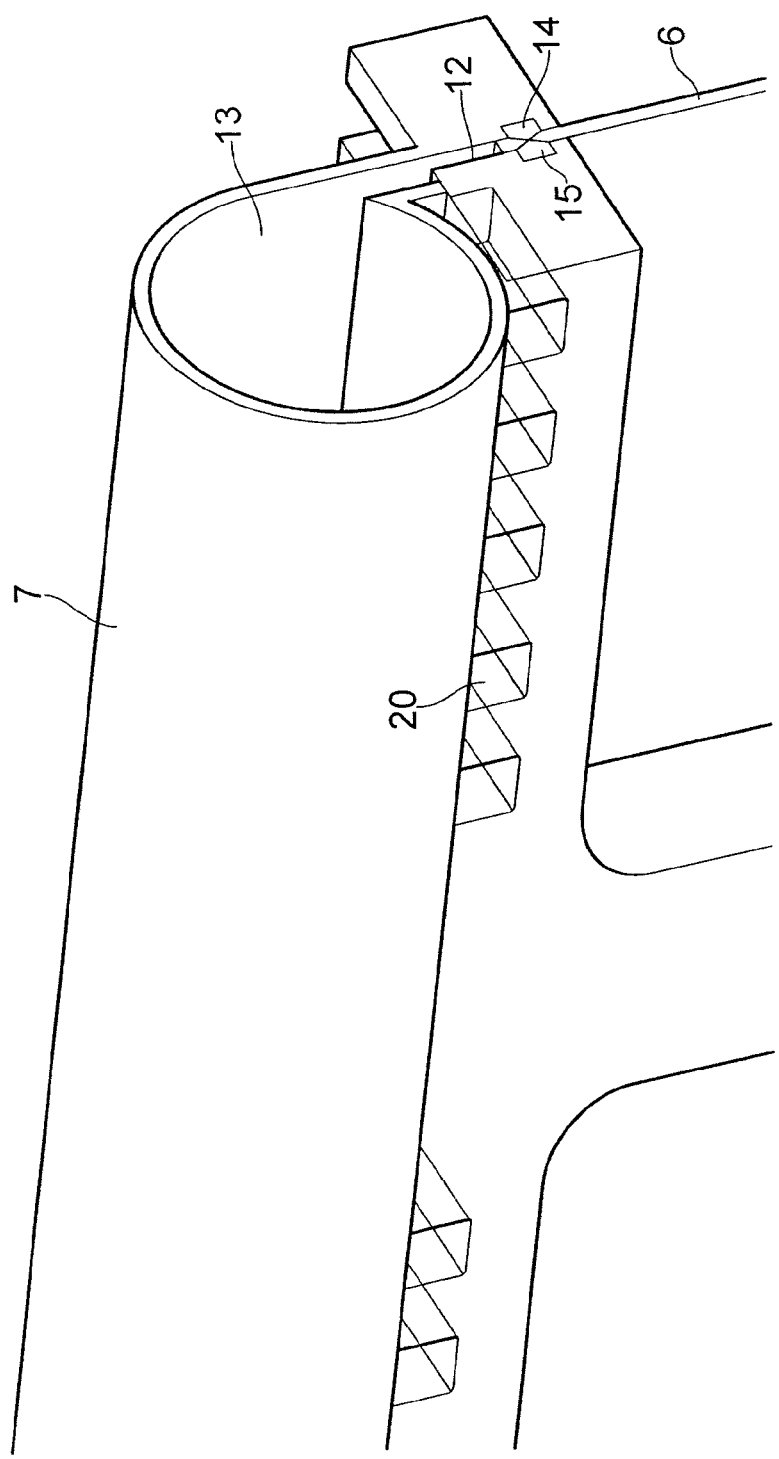
FIG. 5 shows a perspective view of an enlarged portion of the membrane receptacle of FIG. 4.

With reference to FIG. 5, a perspective view of the frame 4 partially cut away reveals the interior chamber 13 of the receptacle 7 which receives the membrane 6. The membrane 6 passes into and out of the chamber 13 by way of the slot 12 which may incorporate a pair of opposing slot seals 14, 15 which lightly grip the membrane 6 passing through the slot, sufficiently to tension the membrane and hold it in position, but not sufficiently to prevent sliding passage of the membrane between the slot seals when it is driven through the slot 12.

Preferably the slot seals 14, 15 comprise 100 micron thickness Kapton sheet or 50 micron thickness stainless steel sheet, or any other low compliance material and may be coated with a suitable lubricant. The peripheral seal 9 (and any other seals in the pillars 10) may also be coated with a suitable lubricant. Preferably, any lubricants or lubricious coatings used are free of materials which could contaminate the chemically sensitive components of the fuel cells, such as the MEAs. Silicone-free lubricants may be desirable.

Figure 6:
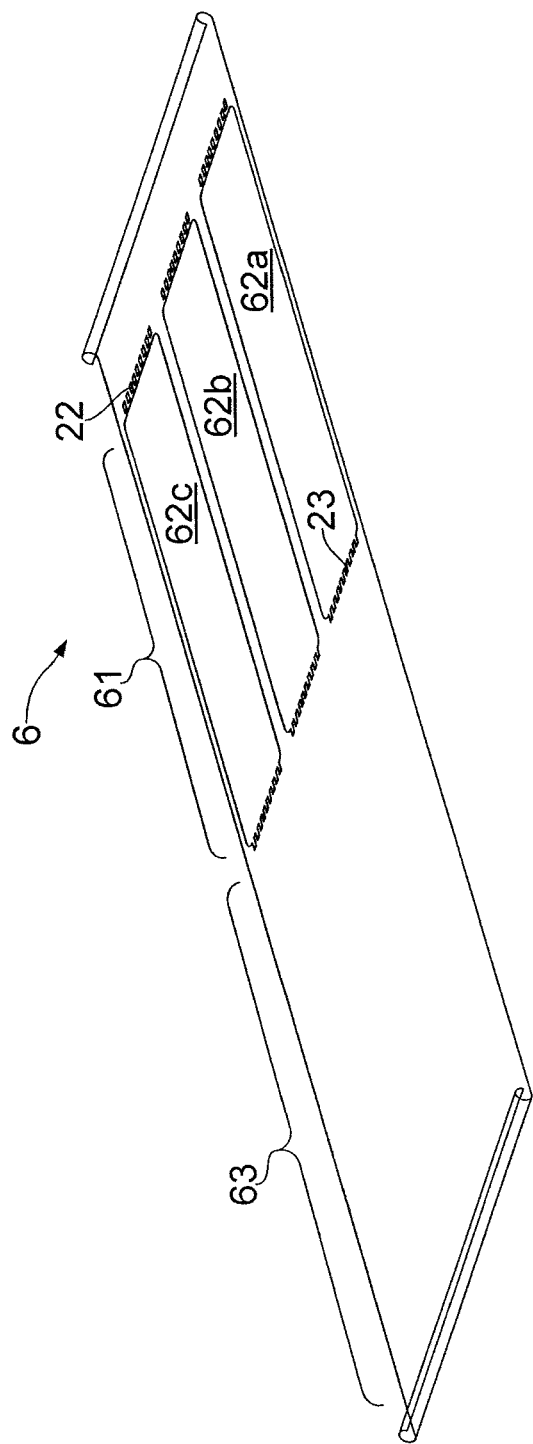
FIG. 6 shows a perspective view of an unrolled membrane for use in the system of FIGS. 1 to 5.

FIG. 6 shows a perspective view of the membrane 6 suitable for use with the frame 4, in unrolled condition. The membrane 6 comprises a sheet of material which can be used to occlude the ventilation face by providing a barrier or partition wall across the apertures 5a, 5b, 5c. In the particular arrangement shown in FIG. 6, the membrane 6 has a first portion 61 with apertures 62a, 62b, 62c which broadly correspond in size and shape to the apertures 5a, 5b, 5c in the frame 4. A second portion 63 of the membrane 6 is unbroken or continuous across an area at least as large as the area of apertures 5a, 5b, 5c in the frame 4, thereby being capable of completely occluding, i.e. blocking, the apertures 5a, 5b, 5c in the frame when in an appropriate position.

The membrane is preferably rollable into a compact roll when being received into the first or second receptacles 7, 8.

The membrane 6 may also include a number of separate apertures 22 or cut-away slots 23 which correspond to the apertures 20 and cut-away slots 21 in the frame 4 described in connection with FIG. 3.

In normal use, one of the portions 61, 63 of the membrane is received into the respective receptacle 7 or 8 while the other portion 61, 63 extends across the frame 4 defining the apertures 5a, 5b, 5c. Thus, in a first configuration, which may be regarded as a 'ventilation face open' configuration, the first portion 61 of the membrane 6 lies over the portion of the frame 4 defining the apertures 5a, 5b, 5c and the second portion 63 of the membrane 6 is rolled up within the top receptacle 8. In a second configuration, which may be regarded as a 'ventilation face closed' configuration, the first portion 61 of the membrane 6 is rolled up within the bottom receptacle 7 and the second portion 63 of the membrane 6 lies over the portion of the frame defining the apertures 5a, 5b, 5c thereby occluding those apertures.

Each of the receptacles 7, 8 preferably includes a motor drive arrangement configured to pull the membrane into the chamber 13 and roll it around a spindle in the chamber. A motor drive arrangement may be disposed within each chamber or may be located in one or both axial ends of each receptacle. By providing a motor at each end of the membrane, i.e. in each of the receptacles 7, 8, the membrane can be maintained in tension while in motion by using a pulling action of the appropriate motor drive. This pulling action can be against any friction applied by passage of the membrane through the opposing slot seals 14, 15 adjacent to the opposite receptacle.

Alternative ways of maintaining tension of the membrane 6 during transport could be used. For example, the motor at each end of the membrane could be configured to work in opposition to the other motor, thereby providing a driving torque at one end of the membrane/frame and a braking torque at the other end. Preferably brushless motors are used to minimise risk of contamination to the air flow path of the fuel cell stack. In another arrangement, a motor drive mechanism could be provided at one of the receptacles 7, 8 and a spring bias return mechanism provided at the other receptacle 7, 8. In this way, the motor drive mechanism provides motive power for operation of the membrane in one direction, against the spring bias, and the spring bias provides motive power for operation of the membrane in the other direction.

Positioning of the membrane 6 could be controlled in a number of different ways. For example, the membranes could be provided with a series of longitudinally extending perforations (not shown in the drawings) which can be read and counted by an optical or mechanical or other sensor. Different shapes of perforation could also be encoded for different positions. Alternatively, if servo-controlled motors are being used, the membrane positioning could be established by suitable motor controllers.

In a general aspect, the frame 4 with its receptacles 7, 8 and the membrane 6 together define a shutter mechanism or occlusion mechanism for fully occluding or partially occluding a fuel cell stack 1 ventilation face 2. The occlusion mechanism can be repeated on any other ventilation face of the fuel cell stack 1, such as on an opposite side of the stack to the front side visible in FIGS. 1 and 2. Each occlusion mechanism might provide cover for only a part of a ventilation face 2 and multiple such occlusion mechanisms could be used to occlude different parts of one ventilation face of a fuel cell stack.

Where an occlusion mechanism is provided on opposing ventilation faces of a fuel cell stack, the occlusion mechanisms could be configured to operate in opposite directions. One occlusion mechanism can be configured to close the ventilation face 2 by rolling the membrane 6 in an upward direction, while the other occlusion mechanism can be configured to close the opposing ventilation face in a downward direction. In this way, shut-off or reduction of air supply to all cells 16 in the stack can be achieved in a shorter time.

Many different designs of membrane can be used. The first portion 61 may be configured to completely open the openings 5a, 5b, 5c, e.g. by defining apertures 62a, 62b, 62c which are all as large as, or slightly larger than, the respective openings 5a, 5b, 5c in the frame 4. Alternatively, the first portion 61 may be configured to at least partially open the openings 5a, 5b, 5c by defining more restrictive apertures. The second portion 63 may be configured to completely obstruct the openings 5a, 5b, 5c or could provide some small apertures restricted in size or extent over the openings 5a, 5b, 5c.

In another arrangement, the membrane 6 could include other portions as well as the first and second portions 61, 63. These other portions could provide different varying degrees of occlusion between completely open and completely closed, so that the ventilation face 2 or faces can be partially occluded. This can be useful when it is desirable to reduce air flow to provide a temporary and/or localised reduction in air flow for the purposes of, for example, increasing the hydration level of some cells, or of some parts of some cells. The membrane 6 could be provided with, for example, a third portion and a fourth portion in which the third portion occludes only a first subset of the overall number of cells in the stack and the fourth portion occludes only a second subset of the overall number of cells in the stack. The first and second subsets could be mutually exclusive. In this way, the cells in the stack could be selectively rehydrated in groups. A control mechanism may be provided to monitor the hydration level of cells within the stack and/or to monitor cell voltages in the stack, and to control the positioning of the membrane to effect systematic rehydration.

In another arrangement mentioned above, in which the membrane 6 travels in a direction which is parallel to the planes of the cells 16, occlusion of only some of the ventilation apertures of each cell 16 is possible. In this way, partial occlusion of each cell in the stack simultaneously is possible, e.g. for reduced power output. Generally, the membrane may be moveable to an intermediate configuration in which some air flow conduits in each cell are occluded and other air flow conduits in each cell are not occluded.

The apertures (e.g. 62a, 62b, 62c) in the membrane 6 preferably have rounded or bevelled corners to reduce the risk of snagging as the leading and trailing edges of the membrane pass over or through the seals 9, 14, 15 or through the slot 12.

The membrane 6 may be formed of any suitable flexible material. Preferably the membrane can be rolled into a chamber. Preferably the membrane can be rolled around one or more capstans in a receptacle such as receptacles 7, 8. A preferred material is Kapton which offers very low oxygen and carbon dioxide permeability even with very thin sheets. Another possible material for the membrane 6 is stainless steel sheet or film, or other metal sheet or film. Preferably, the membrane 6 used is one which will provide a high degree of protection to ingress of compounds which could be chemically damaging to sensitive parts of the fuel cells Such compounds which can readily be airborne include hydrogen sulphide.

The frame 4 may be configured so that the membrane 6 is kept as close as possible to the ventilation face 2 of the fuel cell stack 1, e.g. so that there is limited circulation of air permitted between the membrane when closed and the many ventilation apertures of the individual cells making up the ventilation face. To achieve this, the membrane 6 may engage with a seal 9 on an internal face of the frame 4, e.g. in a channel or groove in the frame, or on a rear face closest to the stack ventilation face. The edges of the membrane 6 may be configured thereby to travel within a channel or groove so that both front and back faces of the membrane are in sliding engagement with a peripheral seal in the frame 4.

Motors used to drive the membrane 6 could be electric motors, air motors or hydraulic motors or any other suitable drive mechanism.

There are many and various benefits of the membrane occlusion mechanism as described here. The membrane occlusion mechanism enables very rapid shut-off of air flows through the fuel cell stack, rather than having to wait for spin-down of fans which may be force-ventilating a stack, or having to provide active braking systems on such fans which adds to fan cost. Rapid shut-off of air flow through the stack can prevent undue dehydration of cells during a shut-down process and can force a rapid drop of current output through loss of oxidant supply. A rapid shut-down without excessive moisture loss can provide much faster and more efficient restart of a fuel cell stack because the fuel cell MEAs remain hydrated. Systems such as described herein are expected to operate to close a ventilation face of a fuel cell stack as quickly as within 0.1 to 0.5 second with suitable motor drive equipment and membrane type, depending upon size. However, it may be possible to achieve faster or slower times. The occlusion mechanism may also serve to provide air pulsing to a stack to further control stack hydration.

Other embodiments are intentionally within the scope of the accompanying claims.

The invention claimed is:

1. A fuel cell stack assembly comprising:
a stack of fuel cells occupying parallel planes, with each fuel cell having an air flow conduit with an input/output ventilation aperture on an edge of the fuel cell such that the input/output ventilation apertures of the fuel cells form an array over a ventilation face of the stack; and,
a membrane moveable between a first configuration in which the ventilation face is occluded and a second configuration in which the ventilation face is not occluded;
wherein the membrane is rollable between the first configuration and the second configuration;
wherein the stack assembly further comprises a first receptacle for receiving a first portion of the membrane in a rolled-up condition when the membrane is in the first configuration.

2. The fuel cell stack assembly of claim 1 in which the membrane comprises a first portion providing at least one aperture configured to expose the ventilation face when disposed thereover and a second portion configured to occlude the ventilation face when disposed thereover.

3. The fuel cell stack assembly of claim 1 further including a second receptacle for receiving a second portion of the membrane in a rolled-up condition when the membrane is in the second configuration.

4. The fuel cell stack assembly of claim 1 in which the first receptacle is disposed at a peripheral edge of the ventilation face.

5. The fuel cell stack assembly of claim 4 in which the first and second receptacles are disposed on opposing peripheral edges of the ventilation face.

6. The fuel cell stack assembly of claim 1 further including a motor configured to drive the membrane between the first configuration and the second configuration.

7. The fuel cell stack assembly of claim 1 further including a peripheral seal disposed around the perimeter of the ventilation face, the membrane being positioned for engagement with the peripheral seal at least in the first configuration.

8. The fuel cell stack assembly of claim 7 in which the membrane is positioned for sliding engagement with at least parts of the peripheral seal during movement to the first configuration.

9. The fuel cell stack assembly of claim 1 further including a controller configured to operate the membrane between the first and second configurations as part of a fuel cell start up and/or shut down procedure.

10. The fuel cell stack assembly of claim 1 in which the membrane is moveable to an intermediate configuration in which some air flow conduits in each cell of the fuel cell stack are occluded and in which other air flow conduits in each cell of the fuel cell stack are not occluded.

11. The fuel cell stack assembly of claim 1 in which the membrane is configured to move to a configuration in which air flow conduits of first selected cells within the fuel cell stack are occluded and in which air flow conduits of second selected cells within the fuel cell stack are not occluded.

12. The fuel cell stack assembly of claim 10 further including a controller configured to operate the membrane between membrane configurations according to a hydration level of the fuel cells and/or cell voltage levels.

13. A method of operating a fuel cell stack assembly comprising the steps of:
mounting a moveable membrane onto a stack of fuel cells occupying parallel planes, with each fuel cell having an air flow conduit with an input/output ventilation aperture on an edge of the fuel cell such that the input/output ventilation apertures of the fuel cells form an array over a ventilation face of the stack; and,
driving the membrane by rolling-up and unrolling the membrane between a first configuration in which the ventilation face is occluded and a second configuration in which the ventilation face is not occluded,
the stack assembly including a first receptacle for receiving a first portion of the membrane in a rolled-up condition when the membrane is in the first configuration.

* * * * *